United States Patent Office 3,700,414
Patented Oct. 24, 1972

3,700,414
PROCESS FOR THE PREPARATION OF GRANULAR SODIUM PERBORATE TETRAHYDRATE OF LOW BULK DENSITY AND HIGH ABRASION RESISTANCE
Helmut Dillenburg, Bad Honningen, Helmut Honig, Sehnde, and Wilhelm Moser, Ariendorf, near Honningen, Germany, assignors to Kali-Chemie Aktiengesellschaft, Hannover, Germany
No Drawing. Filed July 22, 1970, Ser. No. 57,310
Claims priority, application Germany, July 25, 1969,
P 19 37 805.3-41
Int. Cl. C01b 15/12
U.S. Cl. 23—302
11 Claims

ABSTRACT OF THE DISCLOSURE

A process is presented for preparing granular sodium perborate characterized by low bulk density and high abrasion resistance by quickly crystallizing a mixture of molten sodium perborate tetrahydrate and water while stirring and cooling and drying the obtained crystallisate which contains occluded water. Methods for measuring both the abrasion resistance and the tendency to agglomerate or cake during storage of the sodium perborate tetrahydrate are also presented.

BACKGROUND OF THE INVENTION

Sodium perborate is an essential ingredient in heavy duty detergents. In order to prevent separation of the laundry composition into its individual components by segregation, the bulk density and the grain size of the individual components of the laundry composition must be adapted to each other. The bulk density of sodium perborate obtained by the customary process of precipitation from water solutions of sodium metaborate and hydrogen peroxide generally lies between 0.65 and 0.80 kg./l.; its average grain diameter is between 0.25 and 0.3 mm. The other components of the detergents have considerably lower bulk densities than this and their grain sizes are substantially greater.

Considerable effort has been expended with the objective of obtaining a larger-particle sodium perborate with a lower bulk density, but the products of all the known processes thus far show apparent disadvantages so that no product has had any particular success in the market. Moreover, there has thus far been the difficulty that when the bulk density is reduced the resistance to abrasion is lowered; consequently when a perborate of lower bulk density is obtained it is generally the case that the resistance to abrasion is low and the granules may in fact be completely destroyed during manipulation. As a result, the advantage of the lower bulk density is lost. German patent application DAS 1,240,508 discloses a process during which finely divided, overdried sodium perborate tetrahydrate is sprayed with water in a quantity which is just about adequate for recrystallization of the tetrahydrate; the water in this case contains a cellulose derivate or polymethacrylic compounds or similar binding agents dissolved in it, and the product is granulated in a rotating cylinder. The granules derived in this way have a bulk density between 0.400 and 0.600 kg./l. and diameters lying between about 0.4 and 1.5 mm.

This process has the disadvantage that heat energy is needed for producing the overdried material and that it is very difficult to accomplish the recrystallization with the exactly calculated quantity of water so that the crystallisate contains surplus water which must be removed. Furthermore, the resulting granules have a low abrasion resistance.

According to German patent application DAS 1,275,521, a highly viscous, supersaturated solution of perborate is atomized, whereby the accompanying water is trapped in the resulting granules. As is obvious, working with supersaturated solutions is difficult. The nozzles are easily blocked and special apparatus and manipulations are required in order to prevent premature crystallization of the material. In addition, the process requires concentrated metaborate and hydrogen peroxide solution which must be concentrated by distillation prior to the operation. This introduces an additional expense.

SUMMARY OF THE INVENTION

It is an object of the invention to prepare sodium perborate tetrahydrate in granular form. It is a further object of the invention to prepare sodium perborate tetrahydrate of a low bulk density. It is still another object of the invention to prepare sodium perborate tetrahydrate which is highly abrasion resistant. It is yet a further object to prepare sodium perborate tetrahydrate at low cost.

These objectives are met by melting sodium perborate tetrahydrate, adding water to the molten sodium perborate while cooling and stirring the mixture and effecting complete crystallization of the sodium perborate tetrahydrate under occlusion of substantially all of the water present as quick as possible while cooling and mixing is continued. The obtained crystallized product is then dried.

DESCRIPTION OF THE PREFERRED EMBODIMENTS

In the process according to the invention an important factor is the rapidity of crystallization. The more rapidly the perborate is crystallized out, the finer is the crystal size and the greater is the percentage of occluded water. This has the result that the bulk density is lowered and the resistance to abrasion is increased.

Since the rapidity of crystallization depends on the temperature, the mix must be cooled during the crystallization step. In keeping with this objective, the added water may be cooled prior to addition. The efficacy of cooling, as is well known, depends on the temperature difference between the cooling medium and the material being cooled, the size of the cooling area in proportion to the quantity of material being processed and the efficacy of heat transfer in the system. The rate of cooling should be adjusted so that in each case crystallization is completed in a maximum of 30 minutes and preferably in 5–20 minutes.

Another possibility for accelerating the rate of crystallization is to add perborate dust i.e. perborate particles having a diameter under 0.1 mm. to the mixture of melt and water. Thereby crystallization is spontaneously induced; as a result the number of very fine crystal nuclei is also increased.

The weight ratio of water to melt has an influence on the bulk density of the perborate granules formed, since the bulk density is affected by the quantity of occluded water in the crystallized product. To obtain the desired bulk density of about 0.500 kg./l., the crystallized product should contain a minimum of 15% and a maximum of 35% and preferably between 20% and 30% of water based on the total weight of crystals and occluded water. The following table shows the dependency of the bulk density on the fraction of water in the system.

| Occluded water content (percent): | Bulk density (kg./l.) |
|---|---|
| 17 | 0.52 |
| 19 | 0.50 |
| 21 | 0.49 |
| 24 | 0.47 |

There is no point in attempting to increase the fraction of water beyond the limit shown in the table since the abrasion resistance will not satisfy.

The amount of water to be added must include the possible losses of water by vaporization. It is important that the product contains the above mentioned quantity of water after crystallization.

It is advantageous instead of using water with the melt, to add the mother liquor from the previous batch. This has the double advantage that it is pre-cooled and that it contains some dissolved perborate.

Surprisingly, it has been found that for an equal bulk density the quantity of added water can be reduced if surface-active agents and/or phosphates and/or silicates are added to the water. This has the advantage that in the drying process the quantity of water which must be removed from the crystallized product is smaller whereby a savings in energy costs is obtained. The quantity of surface-active material or phosphate should be at least 0.2% and preferably between 0.4 and 0.6%. The quantity of silicate should be at least 1% and preferably 2 to 3% $SiO_2$, based on the quantity of water added. A further increase in these addition agents as a rule yields no improvement in the bulk density. These materials are believed to function by promoting the formation of nuclei and thereby hindering the formation of large crystals, since more crystals will be formed. The finer the crystals the more water may be occluded in the interstices and capillars between the crystals.

The melting of the perborate should be carried out at the lowest possible temperature in order to avoid loss of active oxygen. It is desirable to add decomposition inhibitors to the perborate during the melting; solid magnesium sulfate is preferred for this purpose.

On grounds of economy it is recommended that as starting material centrifuge-damp perborate be used and that the quantity of water added to the melt be correspondingly reduced. In this way a separate drying of the moist perborate coming from the centrifuge is avoided.

The crystallized product is crumbly and appears to be dry. Drying to remove the excess water occluded in the granules can be done by standard means such as by a vibration drier or in a fluidized bed. To remove the entrapped water practically quantitatively a longer drying time at a lower temperature is preferred to a shorter drying time at a higher temperature. A drying temperature between 40 and 60° C., or preferably between 40 and 50° C. is desirable.

Where a narrow range of particle size is desired, it is advisable to carry out another step prior to the drying. This can consist of processing in a standard commercial granulator. Especially desirable is the apparatus shown in German patent application P 19 36 923.4 (filed July 19, 1969). The described granulating machine consists of a pressure screw rotating in a casing and conveying the feed material to the outlet of the casing, an extruder head rotating directly proximal to said outlet. The extruder head is provided with a plurality of perforations through which the material is extruded for granulation; the perforations each being bounded in part by a wall portion projecting from the surface of the extruder head wall at one side of the respective perforations. By the use of this apparatus a perborate with an average particle diameter of about 0.4 to 0.5 mm. is easily obtained.

The product of the process according to the present invention possesses good solubility, the desired bulk density and high abrasion resistance. The last property is evaluated as follows: a test portion of the perborate is placed on a DIN 30-sieve to remove all fines. The material retained on the sieve is then put into a cylinder which is half full of 5 mm.-diameter lead balls and the cylinder is rotated at a 145 r.p.m. for 15 minutes. The material is then sieved again. The fraction of granules smaller than 0.053 mm. is taken as a measure of the resistance to abrasion.

Materials made according to the present invention show a rub-off of about 10%; materials made with binder show a rub-off of 20–25%.

Perborate granules made according to the present invention in addition to having a low bulk density and a high resistance to abrasion must also have a low tendency to caking during deposition. The tendency to cake is measured as follows: A detachable mold is filled with a portion of the test material. The perborate in the mold is placed in a controlled-climate chamber at 40° C. for 100 hours under a pressure of 2 kp./cm.$^2$. After this the mold is opened and, if the molding holds together, a cube is cut out and the loading at which the cube is destroyed is measured.

If the pressure required to destroy the cube is about 1 kg./cm.$^2$ this betokens ill for the storability of the material. The material made according to the present invention yields a cube which is shattered under a pressure of about 100 grams/cm.$^2$.

EXAMPLE 1

In a tank provided with a heating jacket and a mixing screw, 30 kg. of sodium perborate tetrahydrate to which 0.3 kg. $MgSO_4 \cdot 7H_2O$ were added were melted. The molten material and 9 kg. of water were added rapidly and simultaneously to an open mixer with a horizontal mixing element and a cooling jacket. The cooling jacket had a surface area of about 1.7 m.$^2$ through which 1.2 m.$^3$/h. of a cooling brine at a temperature of —12° C. were circulated. The mixing was continued, the crystallization began in about 2 minutes and was complete in another 10 minutes. The fine crystalline product obtained in this way had an occluded water content of about 19.6% in contrast to the theoretical value of 22.9% based on the initial amount of water added; in other words, a fraction of the added water was evaporated. After drying in a fluidized bed with dry air at a temperature of 40–50° C., 26.5 kg. of granules were obtained. The perborate dust produced simultaneously was recovered in a cyclone downstream from the drier and was recycled in the process.

The granular fraction with an average diameter of 0.5 mm. was sieved off. The bulk density amounted to 0.50 kg./l. According to the previously described tests the rub-off was 11%.

EXAMPLE 2

As described in Example 1, 9 kg. of water, 27 kg. of perborate melt to which 0.27 kg. of $MgSO_4 \cdot 7H_2O$ were added and 3 kg. of dust from a previous batch were mixed with cooling. Crystallization started in 1.5 minutes and was complete in a total of 11 minutes. After crystallization, the fine crystalline material had an occluded water content of 21%.

The apparently practically dry material was processed in a commercial grinder; granules with an average diameter of 0.5 mm. were obtained. These were dried in a fluidized bed at a temperature of 40–50° C. 26.5 kg. of granules with a bulk density of 0.49 kg./l. and a rub-off of 10% were obtained.

EXAMPLE 3

28 kg. of centrifuge-damp perborate with an adhering water content of 4% and 0.27 g. of $MgSO_4 \cdot 7H_2O$ were melted in a tank fitted with a heated jacket and a screw-type mixer. As described in Example 1 the melt was then mixed in an open mixer with cooling with 6.5 kg. of mother liquor from a previous batch at 3° C.; the mother liquor contained 5 g. of sodium perborate per liter and 36 g. of sodium hexametaphosphate (amounting to 0.5% based on the amount of water present in the mixture). Simultaneously 3 kg. of perborate dust were added. Taking into consideration the amount of water adhering to the centrifuge-damp perborate and the water in the mother liquor, the water content amounted to 20.1% in comparison with 23.1% which was the quantity used in the previous examples.

Crystallization started in 1.5 minutes and was complete after another 9.5 minutes. The fine crystalline material had an occluded water content amounting to 17.5%.

The obtained product was introduced into the hopper of a granulating machine as described in the German patent application P 19, 36 923.4. The hopper was provided with a screw which conveyed the material to a second pressure screw, located in a casing and rotating about an axis inclined to the axis of the first screw; both screws rotating at a speed of 20–22 r.p.m. Directly in front of the outlet of the casing an extruder head is rotating at 120 r.p.m. about an axis vertical to the axis of the pressure screw. The extruder head is provided with a plurality of perforations each having a diameter of 1.3 mm. and which are bounded in part by a wall portion projecting from the outer surface of the extruder head wall at one side of the respective perforations. The material entering the casing of the pressure screw is advanced therein under pressure and finally pressed against the extruder head, the projections of which cut a certain quantity out of the pressure supplied material to issue in form of granules which were subsequently dried in a fluidized bed at 40–50° C.

The obtained granules had a bulk density of 0.49 kg./l. and a rub-off of 13%, their average diamter was 0.4 mm.

Similar results were obtained when Marlopon AT 50 (triethanolamine tetrapropylenebenzenesulfonate) was used instead of sodium hexametaphosphate.

EXAMPLE 4

As described in Example 1, 13.5 kg. of mother liquor at 3° C. containing 5 g. of perborate per liter, 1.7 kg. of water glass with an $SiO_2$ content of 26%, 30 kg. of molten perborate, and 3 kg. of perborate dust were simultaneously combined under mixing and cooling. The water content of the perborate-water mix came to 29.8%. Crystallization was effected while continuously mixing and cooling. Crystallization started after 1.5 minutes and was complete after 13 minutes. After crystallization the product had an occluded water content of 27.5%.

The crystals were processed in the granulating machine described in German patent application P 19 36 923.4 and were dried in a fluidized bed between 40 and 50° C. 28.8 kg. of granules with an average granular diameter of 0.5 mm. were obtained; the bulk density was 0.46 kg./l. and the rub-off was 9%. 4.2 kg. of perborate dust were recovered in the cyclone separator downstream from the drier.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

What is claimed is:

1. Process for the preparation of abrasion-resistant, granular sodium perborate tetrahydrate having a low bulk density, comprising the steps of melting solid sodium perborate tetrahydrate; adding water to said molten sodium perborate tetrahydrate and simultaneously mixing the said molten sodium perborate tetrahydrate with said water in a mixing vessel while continuously cooling and stirring the mixture so as to effect complete crystallization of the sodium perborate tetrahydrate under occlusion of substantially all of the water present as rapidly as possible and then drying the crystallized granular product to remove the occluded water, the amount of said added water being sufficient to provide for an occluded water content of about 20 to 30% in said crystallized sodium perborate tetrahydrate product in which the water content is in excess of the water of hydration prior to drying.

2. Process as defined in claim 1, wherein a substantial proportion of the product granules have mean diameters ranging from about 0.4 to about 0.5 mm., with the remainder being divided between a portion smaller than 0.4 mm. an da portion larger than 0.5 mm.

3. Process as defined in claim 1, wherein sodium perborate dust is added to the mixture of molten sodium perborate and water to provide nuclei for crystallization.

4. Process as defined in claim 1, wherein said crystallization is substantially completed in not more than 30 minutes.

5. Process as defined in claim 4, wherein said crystallization is substantially completed in from 5 to 20 minutes.

6. Process as defined in claim 1, wherein said granular product is dried at a temperature between about 40° C. and about 60° C.

7. Process as defined in claim 1, wherein said granular product is dried at a temperature between about 40° C. and about 50° C.

8. Process as defined in claim 1, wherein a member of the group of addition agents consisting of surface active substances, phosphates and silicates is added to the water which is added to the molten sodium perborate tetrahydrate.

9. Process as defined in claim 1, wherein a stabilizing agent is included with said sodium perborate tetrahydrate to be melted in order to minimize loss of active oxygen.

10. Process as defined in claim 9, wherein said stabilizing agent is $MgSO_4 \cdot 7H_2O$.

11. Process as defined in claim 8, wherein the quantity of addition agent added is from about 0.2% to about 0.6% for surface active agents and phosphates and is from about 1% to about 3% for silicates relative to amount of water added.

References Cited

UNITED STATES PATENTS

| | | | |
|---|---|---|---|
| 2,257,461 | 9/1941 | Gilbert | 23—60 |
| 2,863,835 | 12/1958 | Goldsmith | 23—60 |
| 2,900,668 | 8/1959 | Hubner | 23—60 |
| 2,979,464 | 4/1961 | Pistor | 23—60 |
| 3,278,276 | 10/1966 | Pellen | 23—302 |
| 3,510,269 | 5/1970 | Bittner | 23—60 |

FOREIGN PATENTS

| | | |
|---|---|---|
| 924,291 | 4/1963 | Great Britain. |
| 968,742 | 9/1964 | Great Britain. |
| 761,371 | 11/1956 | Great Britain. |
| 1,039,436 | 8/1966 | Great Britain. |
| 742,079 | 12/1955 | Great Britain. |

WILBUR L. BASCOMB, JR., Primary Examiner

S. SILVERBERG, Assistant Examiner

U.S. Cl. X.R.

23—60